Oct. 1, 1929.  R. D. H. VROOM  1,730,101
DRAPERY HOOK
Filed July 23, 1928
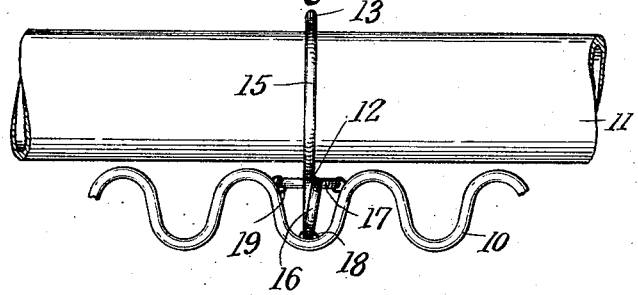
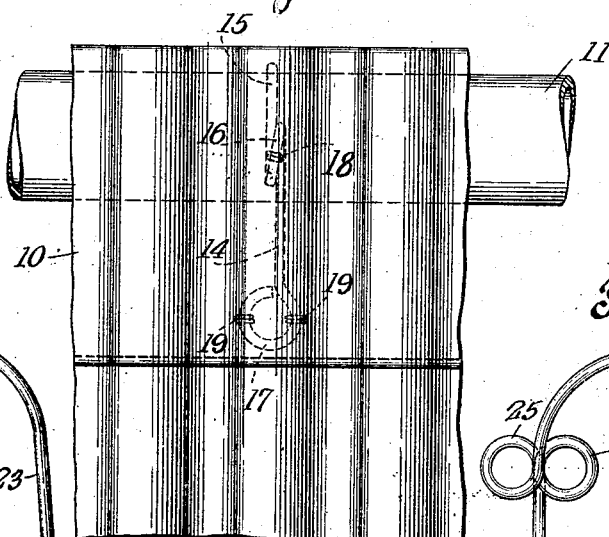
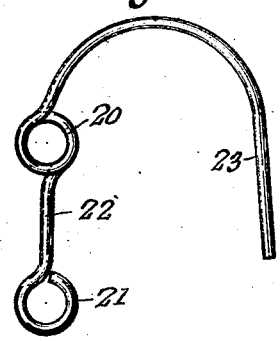
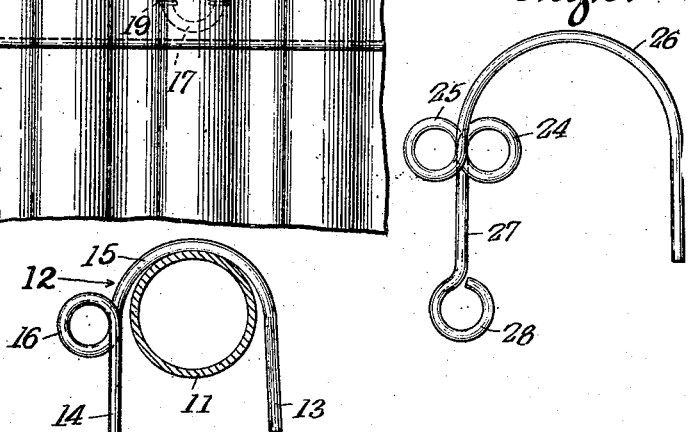
INVENTOR
Robert D. H. Vroom
BY
Mitchell + Bechert
ATTORNEY Patented Oct. 1, 1929

1,730,101

UNITED STATES PATENT OFFICE

ROBERT D. H. VROOM, OF PORT RICHMOND, NEW YORK, ASSIGNOR TO H. L. JUDD COMPANY, INC., OF WALLINGFORD, CONNECTICUT, A CORPORATION OF DELAWARE

DRAPERY HOOK

Application filed July 23, 1928. Serial No. 294,649.

This invention relates to a drapery hook, and in particular to a hook made of a single length of wire.

An object of the present invention is to provide a simple form of drapery hook having an open hook portion adapted to fit over a rod and provided with loops at spaced points upon a shank portion for attaching the hook to a drapery at a plurality of separated points.

Another object of the invention is to provide a hook having an open hook portion at one end and a substantially straight shank portion at its opposite end adapted, when in operative position, to lie against the side surface of a drapery supported thereby, this shank portion having loops formed thereon by means of which it may be attached as by stitching to the drapery, one of the loops being disposed at the junction between the open hook portion and the shank portion, and another loop being disposed at the lower or free end of the shank.

Another feature of advantage in one of the preferred forms of the invention is that by means of the two loops on the shank which in this embodiment are disposed in planes normal to each other, drapery which is adapted to be slightly shirred or pleated at its upper end may be attached to one of the loops of the hook at the central portion of a pleat of the drapery, and the other hook may be attached at the side portions of the pleat.

With these and other objects in view, my invention includes the features of construction and operation set forth in the following specification and illustrated in the accompanying drawing.

In the accompanying drawing annexed hereto and forming a part of this specification, I have shown my invention embodied in a drapery hook for a pleated drapery, adapted to fit over a round rod, but it will be understood that the invention can be otherwise embodied, and that the drawing is not to be construed as defining or limiting the scope of the invention, the claims appended to this specification being relied upon for that purpose.

In the drawing—

Fig. 1 is a plan view of a hook forming the present invention shown in position upon a drapery and engaged over a supporting rod;

Fig. 2 is a front elevation of a drapery and rod with the hook shown in position thereon;

Fig. 3 is a side elevation of a hook made according to the present invention;

Fig. 4 is a view similar to Fig. 3 showing a modified form of hook having two spaced loops disposed in the same plane; and Fig. 5 is a similar view of another modified form of hook having three loops.

In the above mentioned drawing I have shown several embodiments of the invention which are now deemed preferable, but it is to be understood that changes and modifications may be made within the scope of the appended claims without departing from the spirit of the invention.

Referring more in detail to the figures of the drawing, I show a pleated drapery in the form of a curtain 10 somewhat shirred or pleated as indicated clearly in Fig. 1 to form folds or ruffles. This drapery 10 is supported over a suitable supporting rod 11 by the hook 12 forming the present invention and shown clearly apart from the drapery in Fig. 3.

The hook 12 comprises a single length of wire of suitable material having an open hook portion 13 formed at one end, and having a substantially straight shank portion 14 at its opposite end. At the junction between the arch portion 15 of the hook portion 13, and the shank 14 is a circular loop 16 as shown clearly in Fig. 3. This loop 16 is formed by bending the wire of the hook 12 in a circle of relatively small radius. This closed loop 16, as is clearly indicated in Fig. 3, lies substantially in the plane of the hook portion 13 and outside of the curve of the arch portion 15. At the lower end of the shank 14 is another loop 17 closed in the same manner as the loop 16 above described, but lying in a plane substantially normal to the plane of the hook portion 13 and also normal to the first loop 16.

In order to attach the hook 12 shown in Fig. 3 to a drapery 10, the upper loop 16 lying in the plane of the open hook portion 13 is stitched as shown at 18 in Figs. 1 and 2 to the central or mid-section of one of the folds or pleats of the shirred drapery 10. The stitches 18 engage over the wire of the loop 16 and directly engage the drapery 10. The lower loop 17 which lies in a plane normal to that of the open hook portion 13 is attached to the drapery 10 by two groups of stitches 19 upon opposite sides, each group of stitches 19 engaging over the side of the loop 17 and being in engagement with the drapery upon adjacent sides of one of the folds of the shirred drapery 10. With the hook 12 thus disposed and attached to the drapery 10 by the stitches 18 and 19, the shirring or gathering of the drapery will not be disturbed at the point of attachment of the hook 12. On the other hand the attachment means for this hook 12 will tend to preserve the gathers or pleats in their proper position.

In the modified form of hook shown in Fig. 4, the two loops 20 and 21 on the shank portion 22 are disposed in substantially the same plane as the open hook portion 23. Each of these loops 20 and 21 may be attached by stitching to a drapery. As shown, the loops 20 and 21 may be formed on the shank 22 so that their center lies approximately in the axis of the shank 22.

A further modification of the invention shown in Fig. 5 is provided with two loops 24 and 25 disposed substantially in the plane of the open hook 26 positioned at the junction of the shank 27. A third loop 28 at the lower end of the shank 27 and substantially in the plane of the open hook 26 is also provided. In this form of hook one or both of the loops 24 and 25 may be employed to attach the hook to a drapery by stitching. The loops 24 and 25 lie upon opposite sides of the axis of the shank 27 so that they are each substantially tangent to the shank, one loop 24 being within the curve of the arch forming the open loop 26, and the other loop 2 being outside the arch and in substantially the same plane as loop 24.

I claim:

1. A drapery hook comprising a single wire bent to form an open hook at one end, a shank portion at its opposite end, a loop formed at the junction of said shank with said hook and lying in the plane of said hook, and a loop at the free end of said shank.

2. A drapery hook comprising a single wire bent to form an open hook at one end, a shank portion at its opposite end, and a plurality of loops formed on said shank at spaced points thereon.

3. A drapery hook comprising a single wire bent to form an open hook at one end, and having spaced loops forming eyes disposed in planes at right angles to each other, and positioned respectively adjacent to and at the opposite end of said hook.

4. A drapery hook comprising a single wire bent to form an open hook at one end, a straight shank portion at its opposite end, a loop formed at the junction of said shank with said hook, and a loop at the free end of said shank, said loops being disposed in planes at right angles to each other.

5. A drapery hook comprising a single wire bent to form an open hook at one end, a shank portion at its opposite end, a loop substantially in the plane of said open hook at the junction of said shank with said hook, and a loop at the free end of said shank disposed substantially in a plane normal to the plane of said hook.

6. A drapery hook comprising a single wire bent to form an open hook at one end, a shank portion at its opposite end, a closed loop substantially in the plane of said open hook at the junction of said shank with said hook, and a closed loop at the free end of said shank disposed substantially in a plane normal to the plane of said hook, said closed loops forming attaching means for said hook to a drapery.

ROBERT D. H. VROOM.